Sept. 24, 1968   N. C. PETERSON   3,402,957
FISHHOOK THREADING AND TYING DEVICES
Filed Feb. 24, 1966
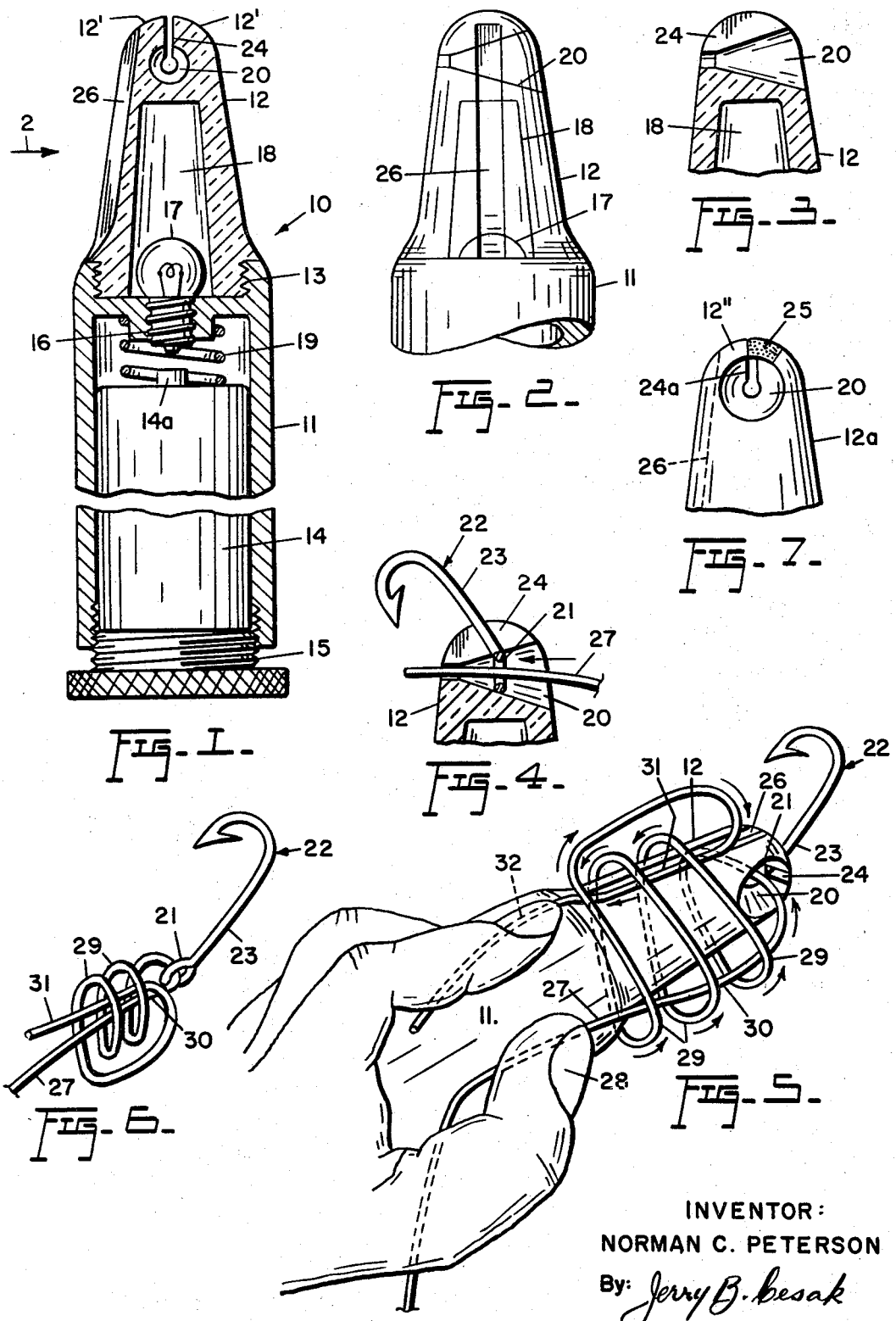
INVENTOR:
NORMAN C. PETERSON
By: Jerry B. Besak

United States Patent Office 3,402,957
Patented Sept. 24, 1968

3,402,957
FISHHOOK THREADING AND TYING DEVICES
Norman C. Peterson, 830 Loop St.,
San Marcos, Tex. 78666
Filed Feb. 24, 1966, Ser. No. 529,856
4 Claims. (Cl. 289—17)

ABSTRACT OF THE DISCLOSURE

A mandrel provided with a funnel-shaped socket for receiving the eye of a fishhook and guiding a line through the eye before the line is wound around the mandrel. The mandrel also has a groove at one side thereof, through which an end portion of the line may be passed to form a knot when the wound line is slipped off the mandrel. The socket is slit and resiliently yieldable to frictionally hold the fishhook in place. A battery and lamp are provided in the mandrel for illuminating the same.

---

This invention relates to new and useful improvements in fisherman's appliances and the principal object of the invention is to facilitate easy, convenient and expeditious threading of a line or leader through the eye of a fishhook and tying a secure knot at the eye.

This object is attained by the provision of a device including an elongated mandrel which is provided with a funnel-shaped socket for receiving the eye of a hook, the socket serving to effectively guide a line or leader through the hook eye during the threading operation, whereupon the line may be wound in one or more convolutions around the mandrel. The mandrel is also provided at one side thereof with a longitudinal groove so that an end portion of the line may be passed through the convolutions to form a knot at the eye when the latter is withdrawn from the socket and the line convolutions are slipped off the mandrel.

Also, the mandrel is provided with means for frictionally gripping the shank of the hook and thereby retaining the hook eye in the socket, so that it is not at all necessary to manually hold the hook during the threading and tying operation.

As another feature, the device of the invention provides a handle which carries the mandrel, the handle being hollow and accommodating an electric battery and a lamp for effectively illuminating the mandrel to facilitate threading and tying of hooks in darkness.

The device of the invention is simple in construction, compact for convenient portability or storage, efficient in use, and well adapted to economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a longitudinal sectional view of the hook threading and tying device of the invention;

FIGURE 2 is a fragmentary side elevational view thereof, taken in the direction of the arrow 2 in FIG. 1;

FIGURE 3 is a fragmentary view showing the upper portion of FIG. 2 in section;

FIGURE 4 is a view, similar to that in FIG. 3, but with the hook in position and a line being threaded through the eye of the hook;

FIGURE 5 is a perspective view of the device held by hand and illustrating the manner in which the line is threaded through the hook eye and wound around the mandrel;

FIGURE 6 is a perspective view of the hook and line removed from the mandrel in readiness for forming a knot; and FIGURE 7 is a fragmentary elevational view of a modified arrangement of the mandrel.

Referring now to the accompanying drawings in detail, the fishhook threading and typing device of the invention is designated generally by the reference numeral 10 and comprises an elongated body consisting of a substantially cylindrical handle 11 provided at one end thereof with an elongated, longitudinally tapered mandrel 12. The mandrel 12 may be formed integrally with the handle 11 if so desired, although in the preferred arrangement shown in the drawings the mandrel is removably attached to the handle, as for example by screw-threads 13.

The handle 11, which may be in the form of a metallic tube, accommodates an electric battery 14 held in place by a screw-threaded end cap 15. The handle also provides a socket 16 for a lamp 17 which projects into an internal recess 18 formed in the mandrel 12. A coil spring 19 is provided in the handle to bias the battery 14 away from the lamp 17 and thus maintain an open electrical circuit between the battery and the lamp. However, the circuit may be closed and the lamp energized by tightening the screw-threaded end cap 15 so that the battery pole 14a is brought in contact with the lamp, as will be clearly understood.

The mandrel 12 is preferably formed from suitable light transmitting material such as clear or translucent plastic, or the like, and it will be apparent that when the lamp 17 is energized, the entire mandrel will become illuminated to facilitate use of the device during darkness. The aforementioned removable attachment of the mandrel 12 to the handle 11 by the screw-threads 13 permits the mandrel to be removed and access be had to the lamp 17 when replacement of the latter becomes necessary.

As already stated, the mandrel 12 is longitudinally tapered. It is circular in cross-section and the tapered outer end portion thereof is provided with an open-ended funnel-shaped socket 20 which extends transversely to the longitudinal axis of the mandrel and is adapted to receive the eye 21 of a fishhook 22, as shown in FIGS. 4 and 5. The end of the mandrel is also formed with a slit 24 which communicates with and extends radially outwardly from the socket 20, so that the shank 23 of the hook 22 may project outwardly from the mandrel when the hook eye 21 is seated in the socket. The material from which the mandrel is formed has sufficient inherent flexibility and resiliency that portions of the mandrel at the opposite sides of the slit 24 constitute what may be referred to as a pair of resiliently yieldable jaws 12' which frictionally grip the hook shank 23 and thereby retain the hook eye 21 in the socket 20 without any necessity of holding the hook by hand.

In a slightly modified embodiment of the mandrel 12a shown in FIG. 7, the socket 20 is provided with a slot 24a and an insert 25 of suitable resilient material such as rubber, or the like, is adhesively or otherwise suitably mounted in the mandrel at one side of the slot 25 for coaction with a portion 12'' of the mandrel at the opposite side of the slot in frictionally gripping the hook shank. This arrangement may be particularly useful in instances where the material of the mandrel does not possess sufficient inherent flexibility to provide the resiliently yieldable jaws 12' as in the embodiment of FIG. 1.

It will be also observed that the mandrel 12 is provided at one side thereof with a longitudinally extending groove 26, the purpose of which will be hereinafter explained. Preferably, although not necessarily, the groove 26 is formed in a side of the mandrel offset by approximately 90° from the axis of the transverse socket 20, as is best shown in FIGS. 1, 2 and 5.

When the device is placed in use, the hook 22 is applied to the mandrel 12 by inserting the hook eye concentrically into the funnel-shaped socket 20, while the hook shank 23 projects outwardly through the slit 24 (or slot 24a) and is frictionally gripped by the resilient jaws 12' (or by the resilient insert 25), as illustrated in FIGS. 4 and 5. With the hook thus firmly held in this position, it is a simple matter to insert an end portion of a line or leader 27 into the funnel-shaped socket 20 and to thread the same through the hook eye, since the funnel-shaped socket effectively guides the line in its passage through the eye.

After the line 27 has been threaded through the hook eye 21 to a sufficient extent to facilitate looping and formation of a knot which is to be tied, the running length of the line is held against the handle 11, as for example with the thumb as indicated at 28 in FIG. 5. With the other hand, the end portion of the line which has been passed through the hook eye and socket 20 is then wound one or more times around the mandrel 12 in a plurality of convolutions 29, it being noted that these convolutions encompass the mandrel as well as the stretch 30 of the line which extends more-or-less longitudinally of the mandrel from the thumb 28 to the socket 20. When the winding of the line around the mandrel has been completed, the free end portion 31 of the line is passed longitudinally inwardly through the groove 26 and thus through the convolutions 29 onto the handle 11, where it is gripped as by the forefinger 32.

At this point the hook 22 is separated from the mandrel by withdrawing the eye 21 from the socket 20 and as the hook is pulled away, the convolutions 29 slip off the mandrel 12 so that, upon separation from the mandrel, the hook and the associated looped line assume the arrangement shown in FIG. 6 and the looped line thereupon readily tightens into a secure knot at the eye of the hook. It will be observed that the longitudinally tapered form of the mandrel 12 permits the convolutions 29 to easily slip off the mandrel in the final stages of the tying procedure and, of course, any excess length in the free end portion 31 of the line may be cut away after the knot is tightened.

When the device is used in darkness, the lamp 17 illuminates the entire light-transmitting mandrel including the interior of the socket 20, so that both the hook threading and the tying procedures can be effectively carried out under such conditions.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

I claim:

1. In a fishhook threading and tying device, the combination of an elongated mandrel provided in one end portion thereof with an open-ended frusto-conical socket of a circular cross-section, said socket having a relatively large end and a relatively small end and having its longitudinal axis extending transversely of the mandrel for receiving the eye of a fishhook inserted axially through the large end into the socket, said mandrel being formed with an open slit communicating with and extending radially outwardly from said socket along the entire axial length of the socket for reception of a hook shank, said socket serving to guide a line through the eye of a hook in the socket preparatory to winding of the line around the mandrel, said one end portion of the mandrel also being provided with an elongated groove extending in a side surface of the mandrel substantially at right angles to the axis of said socket to receive an end portion of the wound line, whereby a knot may be formed at the eye of the hook when the latter is removed from the socket and the wound line is slipped off the mandrel.

2. The device as defined in claim 1 wherein portions of the mandrel at opposite sides of said open slit art resiliently yieldable and constitute a pair of jaws for frictionally gripping a hook shank therebetween.

3. The device as defined in claim 1 together with an insert of resiliently yieldable material provided in said mandrel at one side of said open slit, said insert coacting with a portion of the mandrel at the opposite side of said slit to frictionally grip a hook shank.

4. The device as defined in claim 1 wherein at least said one end portion of said mandrel is formed from light transmitting material, and a source of light provided in said one end portion of the mandrel.

References Cited
UNITED STATES PATENTS

| | | | |
|---|---|---|---|
| 1,514,010 | 11/1924 | Peck | 289—17 |
| 2,452,735 | 11/1948 | Devine | 240—6.4 X |
| 2,697,624 | 12/1954 | Thomas et al. | 289—17 |
| 3,106,417 | 10/1963 | Clow | 289—17 |
| 3,131,957 | 5/1964 | Musto | 289—17 |
| 3,177,021 | 4/1965 | Benham | 289—17 |
| 2,804,710 | 9/1957 | Stilwell | 43—1 X |

LOUIS K. RIMRODT, *Primary Examiner.*